United States Patent [19]
Nishitani et al.

[11] 3,938,448
[45] Feb. 17, 1976

[54] PLASTIC PALLET

[75] Inventors: Kiyoshi Nishitani, Yokohama; Kimihiro Kawada; Riyuzo Ebina, both of Tokyo; Katsunori Miyoshi, Yokohama, all of Japan

[73] Assignee: Mitsubishi Chemical Industries Ltd., Tokyo, Japan

[22] Filed: July 6, 1973

[21] Appl. No.: 377,110

Related U.S. Application Data

[63] Continuation-in-part of Ser. No. 102,595, Dec. 30, 1970, abandoned.

[30] Foreign Application Priority Data

Apr. 9, 1973 Japan.................................. 48-39440

[52] U.S. Cl. ................................................. 108/58
[51] Int. Cl.² .......................................... B65D 19/18
[58] Field of Search ............................... 108/51–58

[56] References Cited
UNITED STATES PATENTS

| | | | |
|---|---|---|---|
| 3,046,843 | 7/1962 | Rowe ............................ | 108/51 UX |
| 3,187,691 | 6/1965 | Leitzel ............................ | 108/58 |
| 3,307,504 | 3/1967 | Cloyd et al. ............................ | 108/58 |
| 3,424,110 | 1/1969 | Toot ............................ | 108/53 |
| 3,467,032 | 9/1969 | Rowlands et al. ............................ | 108/51 |
| 3,511,191 | 5/1970 | Barry, Jr. et al............................ | 108/58 |
| 3,613,605 | 10/1971 | Holdredge, Jr. ............................ | 108/58 |
| 3,654,874 | 4/1972 | Skinner............................ | 108/51 |
| 3,667,403 | 6/1972 | Angelbeck, Jr............................ | 108/58 |
| 3,680,496 | 8/1972 | Westlake, Jr............................ | 108/51 |
| 3,695,188 | 10/1972 | Granatstein............................ | 108/58 |

*Primary Examiner*—Roy D. Frazier
*Assistant Examiner*—William E. Lyddane
*Attorney, Agent, or Firm*—Oblon, Fisher, Spivak, McClelland & Maier

[57] ABSTRACT

Two component parts of thermoplastic resin each being constructed with a deck board having integrally formed on one surface thereof a plurality of girders being disposed along opposite edge portions at each corner thereon and therebetween and along a line parallel to and midway between the edge portions and a multiplicity of ribs of lesser projection therefrom than the girders are readily assembled by melt adhesion to form a pallet for a fork lift which exhibits excellent strength and rigidity to bending.

13 Claims, 18 Drawing Figures

PLASTIC PALLET

CROSS-REFERENCE TO RELATED APPLICATION

This application is a continuation-in-part of application Ser. No. 102,595, filed Dec. 30, 1970, now abandoned, for "Plastic Pallet and Method of Making The Same," which application is incorporated herein by reference.

BACKGROUND OF THE INVENTION

The present invention relates to plastic pallet and more particularly to a pallet made of synthetic resin for use with a fork lift.

Heretofore, the material most commonly used for constructing a pallet for a fork lift has been lumber. However, lumber is not entirely satisfactory because of certain natural deficiencies, such as, for example, that the resources thereof as material are limited, its supply situation is unstable and a product made therefrom generally has poor chemical resistance and requires complicated manufacturing methods. Metallic pallets also are available, but they are expensive, and therefore, more recently, attempts have been made to produce a plastic pallet.

As is well known, however, the pallet for a fork lift is usually constructed from two sheets of deck board joined by parallel girder materials provided at their respective opposite edges and intermediate portions, whereby a space is provided between the girder portions for receiving the fork. Therefore, a shortcoming of a plastic pallet is that it compares unfavorably with the wooden or metallic pallet in the consideration of strength and resistance to bending because of the natural characteristics of plastic.

Also, since the pallet for a fork lift is, as described hereinabove, a hollow body having a fork-inserting mouth, a one-step molding process, such as, for example, an injection molding process using a thermoplastic material, would require a metallic mold equipped with a sliding core. One step injection molding of a pallet is very difficult, therefore, with conventional molding machines because they are so large.

Furthermore, it is difficult to obtain a plastic pallet which is characteristically comparable to the wooden or metallic pallets in bending strength, even by such means as compression molding, extrusion molding and the like, because the pallet for a fork lift has the particular construction described hereinbefore.

In addition, an enormous molding machine would be required for molding an item such as a pallet having large dimensions and weight, and, therefore, such a pallet becomes remarkably expensive, both for its high initial cost and for its general maintenance.

SUMMARY OF THE INVENTION

Accordingly, it is an object of the present invention to provide a plastic pallet for use with a fork lift having excellent bending strength characteristics.

Another object of the present invention is to provide a plastic pallet for use with a fork lift which is relatively low in cost and easy to manufacture.

Still another object of this invention is to provide a novel method for manufacturing a plastic pallet for use with a fork lift.

Yet another object of this invention is to provide a new and improved method of manufacturing a molded plastic pallet for use with a fork lift which embodies high bending strength characteristics comparable to those of other materials such as, for example, wood and metal.

The foregoing and other objects are attained by the present invention which provides a pallet for a fork lift constructed of a thermoplastic synthetic resin which structurally comprises two component parts of the thermoplastic synthetic resin being mutually melt adhered together at the respective bottom surfaces of girders provided thereon. Each of the component parts has a construction in which a plurality of girders are integrally formed on the surface of a deck board at the corner portions thereof and therebetween and in which numerous ribs lower in projection than the girders are also integrally formed with the deck board on its surface between the girders in a prescribed pattern.

All kinds of thermoplastic resin may be used as a material for manufacturing the pallet of the present invention.

For example, polyolefine resins such as polyethylene and polypropylene, and their copolymer resins, polystyrene resin, acrylonitrile-styrene resin, acrylonitrile-styrene-butadiene resin, polyvinylchloride resin, and the like, may be used. These plastic materials are most preferably molded in the form of a lower foamed body in such a manner that the surface layer is non foamed, although they may be molded in their usual form.

In the case of using a foam, any known foaming agent may be compounded into the resin, and also, if necessary, any conventionally used additives such as filler, pigment, plasticizer, and the like, may be compound therein.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures and wherein.

DETAILED DESCRIPTION OF THE PREFERRED EMBODIMENTS

Figure 2:
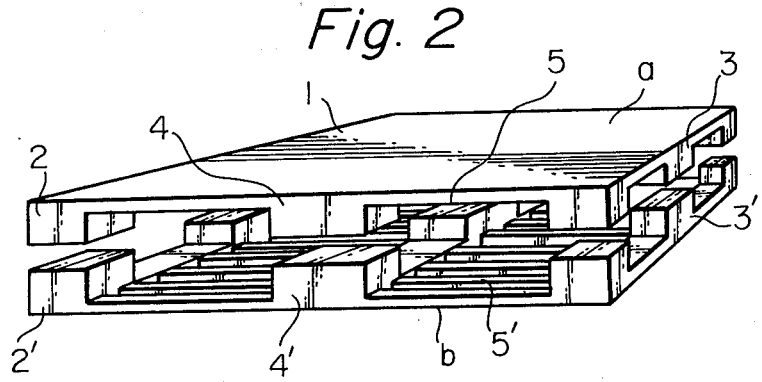
FIG. 2 is a perspective view showing an aspect of manufacturing the pallet shown in FIG. 1.
Figure 14:
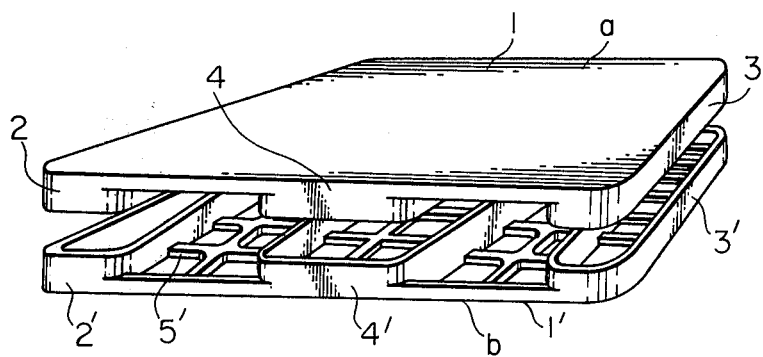
FIG. 14 is a perspective view showing an aspect of manufacturing the pallet shown in FIG. 13.

For manufacturing a pallet according to the present invention, two component parts forming the pallet and designated by the reference characters a and b in both the embodiments shown in FIGS. 2 and 14 are first separately molded, using any of the thermoplastic materials hereinbefore identified. The molding operation can be easily and inexpensively carried out using a conventional metallic mold. Of course, a high efficient molding method such as injection molding may be employed, if desired.

The component parts a and b of the embodiment shown in FIG. 2, respectively comprise upper and lower deck boards 1 and 1', each having projecting girders 2 and 2', respectively, being shown as three in number, integrally formed at the corners thereof and substantially midway therebetween along one edge, similar projecting girders 3 and 3', respectively, also being three in number and integrally formed at the corners and midway therebetween along the opposite parallel edge of the respective boards, and another set of girders 4 and 4', numbering three for each respective board and being integrally formed thereon along a line intermediate and parallel the two edges having the girders 2,2'2, 2'and 3, 3' thereon. Between the lines of girders 2, 3 and 4 and 2', 3' and 4' on the respective deck boards, reinforcing ribs 5 and 5' are integrally formed thereon for strengthening the boards.

Figure 1:
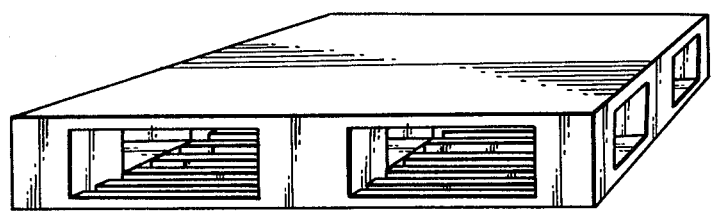
FIG. 1 is a perspective view of one embodiment of a pallet constructed according to the present invention.
Figure 3:
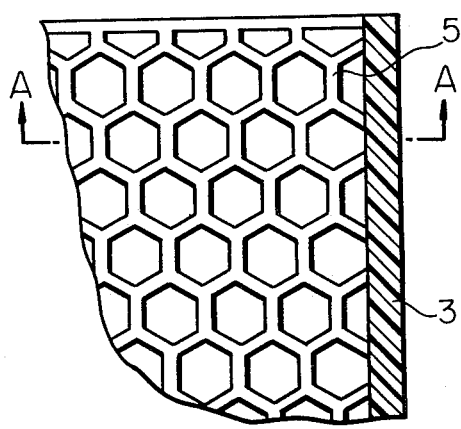
FIGS. 3, 5, 7 and 9 show partial cross sectional views of deck boards of pallets having different rib arrangements, all being embodied by the present invention.
Figure 4:
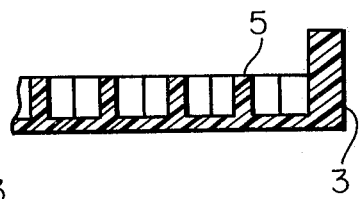
FIGS. 4, 6, 8, and 10 are cross sectional views taken along the lines A—A' of FIG. 3, B—B' of FIG. 5, C—C' of FIG. 7 and D—D' of FIG. 9, respectively.
Figure 5:
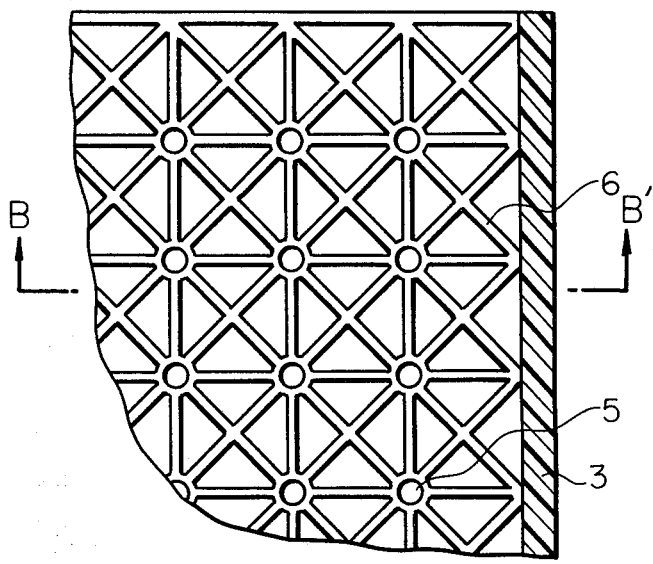
Figure 6:
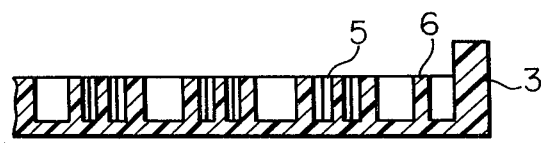
Figure 7:
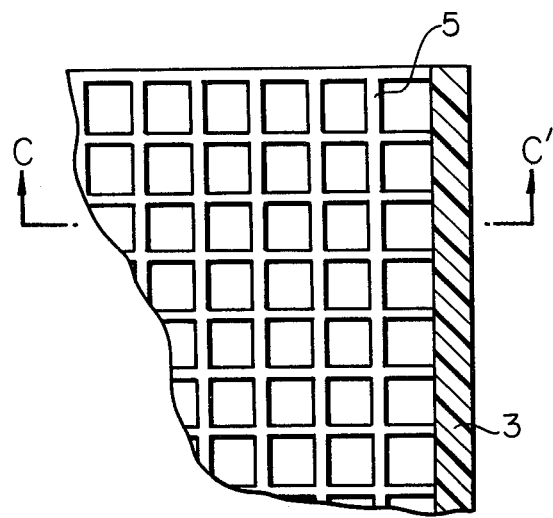
Figure 8:
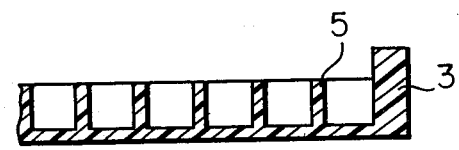
Figure 9:
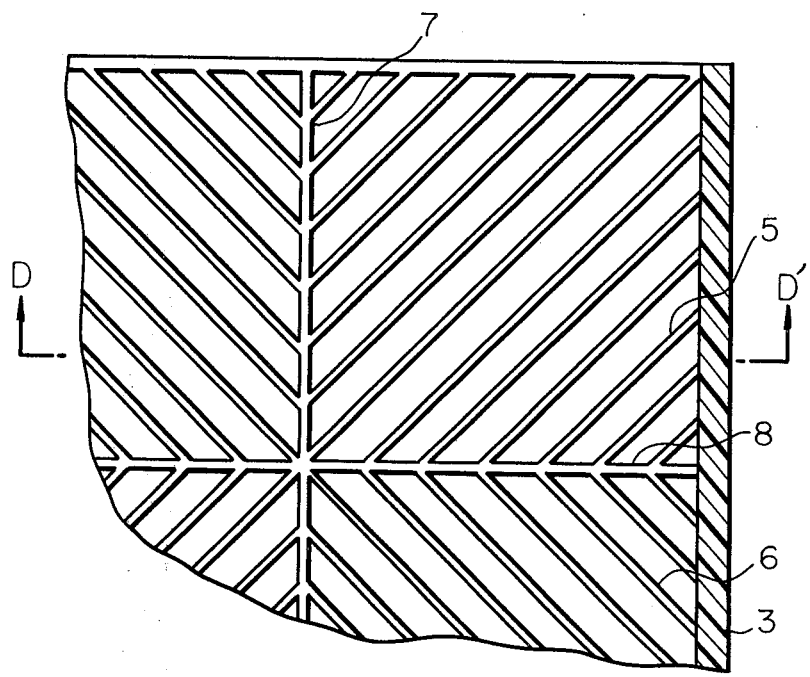
Figure 10:
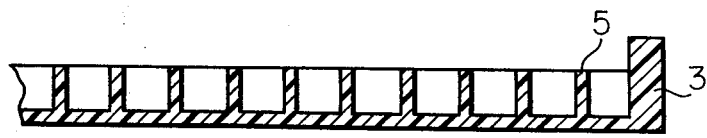

In FIGS. 1 and 2, the reinforcing ribs 5 and 5' on the deck boards 1 and 1', respectively, are arranged parallel to each other at equal intervals and in perpendicular relation to the girder lines. However, as shown in FIGS. 3 and 4, the ribs may be formed in a honey comb configuration, or as shown in FIGS. 5 and 6, a configuration of connected rosary-like ribs 5 with straight line ribs 6 may be used. Furthermore, as shown in FIGS. 7 and 8, the ribs 5 may be formed in a checker-like configuration, and if desired, diagonal ribs 5 and 6 running from perpendicular edge-splitting ribs 7 and 8, as shown in FIGS. 9 and 10 may be provided. Although these ribs protrude perpendicularly from the face of the deck boards, as shown in the respective cross sections, it is to be understood that they may be inclined, if desired.

Figure 13:
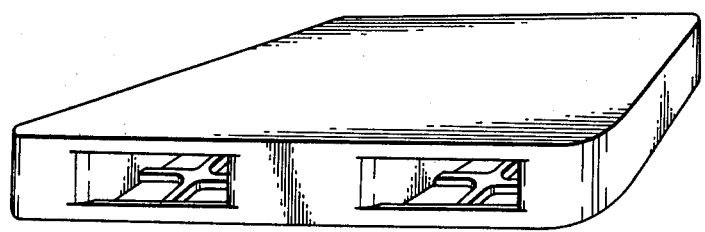
FIG. 13 is a perspective view of still another embodiment of a pallet constructed according to the present invention.

On the other hand, in the embodiment shown in FIGS. 13 and 14, the component parts a and b respectively comprise upper and lower deck boards 1 and 1', each having projecting girders 2 and 2', respectively, integrally formed along the full length of one edge, similar projecting girders 3 and 3', respectively, integrally formed along the full length of the opposite parallel edge of the respective boards, and girders 4 and 4', respectively, being integrally formed on each of the boards along a line substantially intermediate the two edges having the girders 2, 2' and 3, 3' thereon. Between the lines of girders 2, 3 and 4 and 2', 3' and 4' on the respective deck boards, reinforcing ribs 5 and 5' are integrally formed thereon for strengthening the deck boards.

Figure 15:
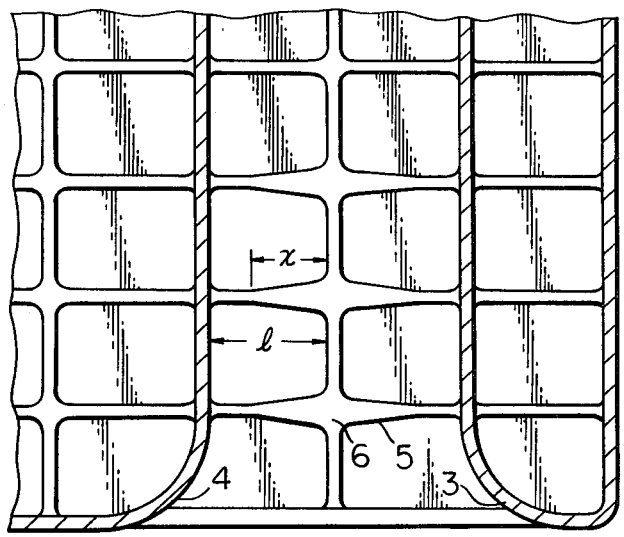
FIGS. 15, 16, 17, and 18 show partial cross sectional views of deck boards of pallets having different rib arrangements, all being embodied by the present invention.
Figure 16:
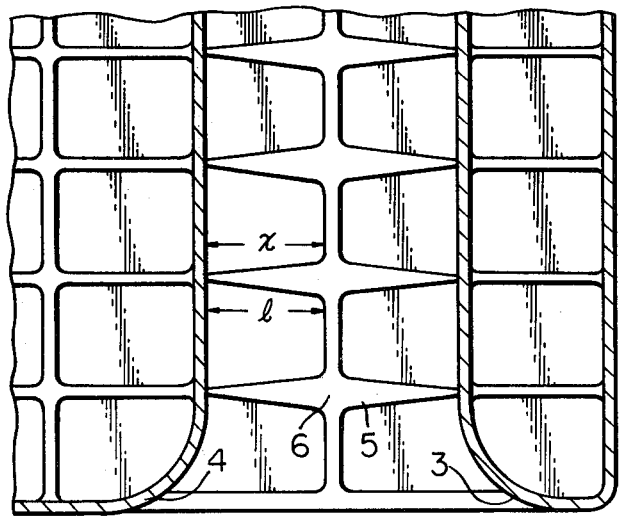
Figure 17:
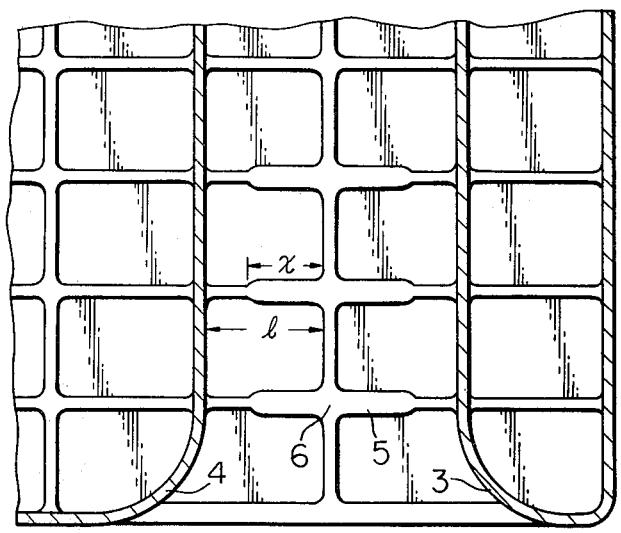
Figure 18:
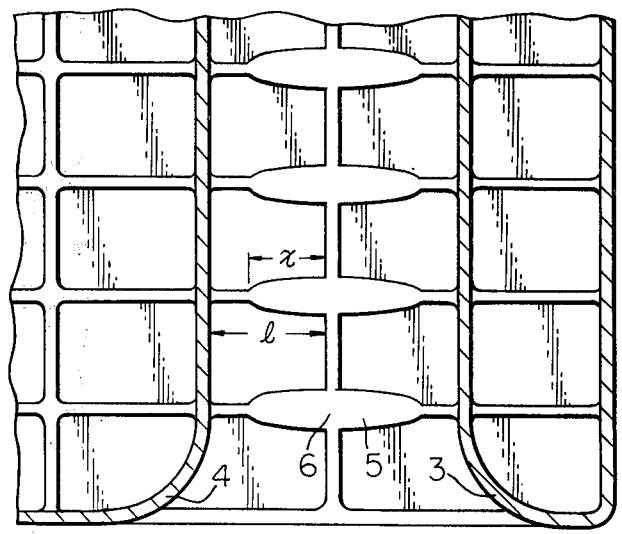

The reinforcing ribs 5 and 5' on the deck boards 1 and 1', respectively, are joined by another rib perpendicular thereto, thus being checkerboard-like in configuration, and are shaped so as to increase in width toward the central part between the girders, being a maximum width in the central part. The width of the ribs 5 and 5' can increase continuously as shown in FIGS. 15 and 16, in steps as shown in FIG. 17, or continuously and in a then changed increasing rate as shown in FIG. 18. In addition, all ribs between the girders may take such shape or only one part thereof need take such shape. This can be optionally decided according to the necessary strength depending upon the manner in which the pallet is used.

In the pallet embodiments shown in FIGS. 13 to 18, the ratio of the length $X$ of the portion of the ribs 5 and 5' having an increased width to the total length $l$ thereof is determined by obtaining such a value of $x$ that, in the formula of equi-distributing load:

$$M = \frac{w \cdot l^2}{2}\left(-\frac{1}{6} + \frac{(l-x)}{2l} - \frac{(l-x)^2}{4l^2}\right)$$

and the formula of concentrating load:

$$M = \frac{W \cdot l}{2}\left(\frac{(l-x)}{2l} - \frac{1}{4}\right)$$

wherein the unit of $x$ and $l$ is cm, that of $W$ is Kg, that of $w$ is Kg/cm and that of $M$ is Kg.cm, for a bar fixed at the both ends, and the value of the moment $M$ is zero. The value of the ratio $x/l$ is preferably above 0.5 more desirably above 0.65. The increasing rate of width in ribs 5 and 5' can be varied depending upon the state of use or number of ribs increasing in width, and also the location of the ribs 5 and 5' or arrangement is varied according to the state of use. Thus, the ribs may be increased in width at the portions near the ends of the pallet, or the ribs having increased width may be alternately arranged on every other line.

In the pallet embodiments shown in FIGS. 13 to 18, a rib 6 the same as or higher than the ribs 5 and 5' in height is preferably arranged in the central part between the girders because, when inserting the fork of a fork lift into the pallet, it will then not be caught on the ribs 5 and 5'. Of course, such a rib construction need not be arranged in the central part or a number of such rib constructions may be arranged, if so desired.

Also, these ribs may be provided on both sides or on only one side of the deck boards, in any of the disclosed embodiments, however, preferably they are provided on the inside surface of the pallet body. Where the ribs are provided on the inside surface of the pallet body, the height of the ribs must of course be lower than that of the girders. Thus, a space for inserting a fork from a fork lift device is formed when the pallet is assembled. Many ribs provided on the surfaces of the deck boards serve to decrease the flexure of the pallet and to increase its strength when lifting the loaded pallet by the fork lift.

The component parts $a$ and $b$ for molding the pallet, which have been separately molded by conventional molding techniques, are then mutually melt adhered at the bottom or exposed surfaces of the respective opposing girders. The most common means for melt adhering the parts comprises contacting the bottom surfaces of the opposing girders of the parts $a$ and $b$ with the surface of a heating plate to melt the bottom surfaces, then removing the heating plate, and, after press adhering the bottom surfaces of the girders of the part $a$ in the molten state with that of the part $b$, cooling them. As the heating plate, for example, a metallic plate coated with Teflon is preferably used and maintained at a temperature higher than the melting temperature of the component parts for molding.

In manufacturing the pallet for a fork lift in accordance with the present invention, as described hereinbefore, it is an indispensable requirement to melt adhere the part a for molding the pallet and the part b mutually at the bottom surfaces of the respective girders, and it is possible, only by such method, to manufacture a plastic pallet which is excellent in strength and low in flexure under loading and when being lifted by a fork.

Another method, for example, of manufacturing a pallet is by drilling a plurality of penetrating holes in the respective girders of the component parts a and b and mechanically joining the penetrating holes by a joining tool such as a bolt and nut. However, a pallet manufactured in this manner is low in strength and high in flexure when loaded and being lifted by a fork and, therefore, is lacking in practical value. In order to improve such properties, the deck board of the loaded upper surface has to be extraordinarily increased in thickness. Thus, the present melt adhering method has been found to overcome these deficiencies and is believed to be the only practical way of successfully obtaining the objectives of this invention. The manufacturing of the pallet in the present invention will be concretely illustrated with the following Examples.

EXAMPLE 1

1.5 part, by weight, of dinitrosopentamethylene tetramine as a foaming agent, 0.5 part, by weight, of talc, and 0.3 part, by weight, of pigment were mixed to 100 parts, by weight, of high density polyethylene and were injection molded to manufacture the component parts a and b, each of which had ribs 5 or 5', as shown in FIG. 1, and had an unfoamed layer in the surface and was 1100 mm. in length, 1100 mm. in width and 75 mm. in height.

The bottom surfaces of girders 2, 2', 3, 3', 4 and 4' of the component parts a and b so obtained were contacted with a Teflon coated heating plate heated to 180°C to melt the bottom surfaces, and then the molten surfaces were pressed and adhered under a pressure of 0.5 Kg/cm$^2$ for 5 minutes to obtain an assembled pallet of 1100 mm. in length, 1100 mm. in width, and 140 mm. in height.

The maximum flexibility of the pallet was measured by taking two supporting points at intervals of 800 mm. in the direction of normally inserting a fork on the under-side of the assembled pallet so obtained and loading a uniformly distributed load of 1000 Kg. thereto, and the following result was obtained.

Further, the results of measurements on a flat deck board not having ribs 5 and 5' are shown for comparison and on those having such constructions as shown in FIGS. 5, 7 and 9.

| Construction of Deck Board | Maximum Flexibility |
| --- | --- |
| Flat Board | 14 mm |
| Board in FIG. 1 | 5 mm |
| Board in FIG. 5 | 9 mm |
| Board in FIG. 7 | 7 mm |
| Board in FIG. 9 | 9 mm |

Thus, the pallet of the present invention having the desired ribs on a deck board has been found to have improved bending rigidity. Also, the results of measurements on the strength of heat welded part were as shown in the following table:

| | Heat Welded | Unwelded |
| --- | --- | --- |
| Yield Strength* | 160 | 144 |
| Breaking Strength* | 165 | 150 |

*The measurement was conducted by bending test at a bending velocity of 3 mm/min.

That is, the present board was superior in strength to one integrally molded in one step.

EXAMPLE 2

1.1 part, by weight, of dinitrosopentamethylene tetramine as a foaming agent, 0.95 part, by weight, of assistant and 0.5 part, by weight, of pigment were mixed to 100 parts, by weight, of high density polyethylene and were injection molded at a temperature of 190° to 210°C to manufacture the component parts a and b, each of which was 1100 mm. in length, 1100 mm. in width and 85 mm. in height. The bottom surfaces of girders 2, 2', 3, 3',4 and 4' of the component parts a and b so obtained were contacted with a Teflon coated heating plate heated to 170°C to melt the bottom surfaces, and then, after removing the heating plate, the molten surfaces were pressed and adhered under a pressure of 4.5 Kg/cm$^2$ for 2 minutes to obtain an assembled pallet of 1100 mm. in length, 1100 mm. in width and 160 in height. The flexibility of the pallet was measured by alternately placing six bales containing 20 Kg of fertilizer in two steps on the under-side of the assembled pallet so obtained and placing the same in three steps on the upper-side of the pallet and further placing a thick steel plate of 1000 mm × 1000 mm in size thereon and then loading a load of 10 tons thereon to measure a change in height of a fork lift inserting mouth. The result was as follows:

| Height of fork lift inserting mouth | | |
| --- | --- | --- |
| | One having tapered ribs | One having non-tapered (straight) ribs |
| Non load | 90.0 mm | 90.0 mm |
| 10 ton load | 83.5 mm | 73.0 mm |
| Flexibility | 6.5 mm | 17.0 mm |

Figure 11:
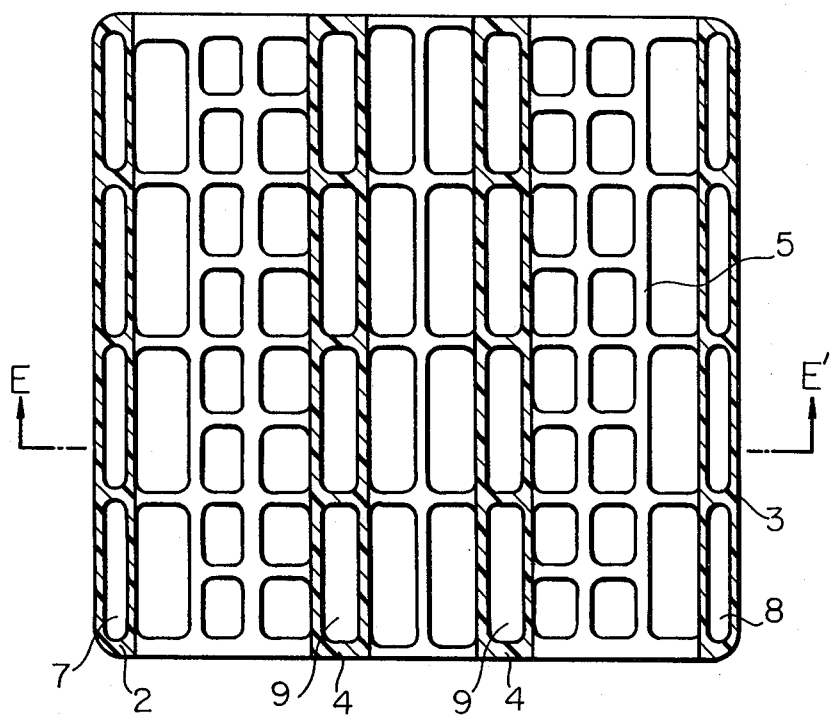
FIG. 11 is a cross sectional view of another embodiment of the pallet of the present invention.
Figure 12:
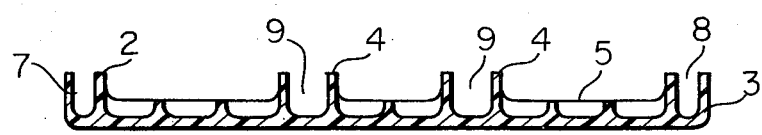
FIG. 12 is a cross section taken along the line E—E' of FIG. 11.

Obviously many modifications and variations of the present invention are possible in light of these teachings. For example, each of the girders 2, 2', 3, 3', 4 and 4' may be hollow for lightening the weight of pallet, as shown by 7, 8 and 9 in FIG. 11. It is to be understood therefore that within the scope of the appended claims, the invention may be practiced otherwise than as specifically described herein.

What is claimed as new and desired to be secured by Letters Patent of the United States is:

1. A pallet of thermoplastic resin material for use with a fork lift comprising:
    a pair of like component parts each having a deck board having an outer smooth and continuous planar surface whereby said pallet is reversible,
    at least one girder integrally formed on each of said deck boards along each of a pair of opposite edge portions thereof and on the deck surface between said edge portions,
    multiple reinforcing ribs integrally formed on said deck board and projecting therefrom a lesser distance than said girders, said component parts being secured together by melt adhesion, with the girders of one being melt adhered to the corresponding girders of the other, and wherein each of said girders comprises an oblong ring, said reinforcing ribs being disposed within and between said girders.

2. A pallet for use with a fork lift comprising:

a pair of like component parts composed of a structure of lower foamed thermoplastic resin material having a non-foamed layer on the surface with each having a deck board and an outer smooth and continuous planar surface, whereby said pallet is reversible, at least one girder integrally formed on each of said deck boards along each of a pair of opposite edge portions thereof and on the deck surface between said edge portions, multiple reinforcing ribs integrally formed on said deck board and projecting therefrom a lesser distance than said girders, said component parts being secured together by melt adhesion with the girders of one being melt adhered to the corresponding girders of the other, and wherein each of said girders comprises an oblong ring, said reinforcing ribs being disposed within and between said girders.

3. The pallet for a fork lift as set forth in claim 2 in which the ribs are arranged perpendicular to the girders.

4. The pallet for a fork lift as set forth in claim 2 in which the ribs are formed in a honey comb configuration.

5. The pallet for a fork lift as set forth in claim 2 in which the ribs are formed as rosaries connected by straight line ribs.

6. The pallet for a fork lift as set forth in claim 2 in which the ribs are formed in a checker board pattern.

7. The pallet for a fork lift as set forth in claim 2 in whcih the ribs include diagonal members intersecting perpendicular edge-splitting members.

8. The pallet of claim 2 wherein at least a number of said ribs increase in width toward the central parts thereof between the girders and the ratio of the portion having increased width to the total length of said rib is more than 0.5.

9. The pallet of claim 8 wherein the width of said at least a number of said ribs increases continuously to the central parts thereof.

10. The pallet of claim 8 wherein the width of said at least a number of said ribs increases in step-like fashion toward the central parts thereof.

11. The pallet of claim 8 wherein the width of said at least a number of said ribs increases continuously and in changed increasing rate toward the central parts thereof.

12. The pallet of claim 8 wherein said at least a number of said ribs are said ribs most adjacent the ends of said pallet.

13. The pallet of claim 8 wherein said at least a number of said ribs are alterate ones of said ribs along a line intermediate said girders.

* * * * *